United States Patent
Dauneria et al.

(10) Patent No.: US 10,820,276 B2
(45) Date of Patent: Oct. 27, 2020

(54) CONTROL OF POWER SOURCE USAGE OF A MULTI POWER SOURCE RADIO DEVICE

(71) Applicant: Telefonaktiebolaget LM Ericsson (Publ), Stockholm (SE)

(72) Inventors: Ankur Dauneria, New Delhi (IN); Sumit Singhal, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 45 days.

(21) Appl. No.: 15/761,697

(22) PCT Filed: Sep. 22, 2015

(86) PCT No.: PCT/IN2015/050115
§ 371 (c)(1),
(2) Date: Mar. 20, 2018

(87) PCT Pub. No.: WO2017/051426
PCT Pub. Date: Mar. 30, 2017

(65) Prior Publication Data
US 2018/0352517 A1 Dec. 6, 2018

(51) Int. Cl.
*H04W 52/02* (2009.01)
*G06F 1/26* (2006.01)
*H04W 4/70* (2018.01)

(52) U.S. Cl.
CPC ........ *H04W 52/0296* (2013.01); *G06F 1/263* (2013.01); *H04W 4/70* (2018.02);
(Continued)

(58) Field of Classification Search
CPC ......... H04W 52/0296; H04W 52/0209; H04W 52/02; H04W 52/0216; H04W 52/0212;
(Continued)

(56) References Cited

U.S. PATENT DOCUMENTS

| 2014/0258474 A1* | 9/2014 | Kim ........................ H04W 4/70 709/219 |
| 2014/0293967 A1* | 10/2014 | Kim ...................... H04L 5/0055 370/335 |
| 2016/0248125 A1* | 8/2016 | Huang .............. H01M 10/4257 |

FOREIGN PATENT DOCUMENTS

| WO | 2009106679 A1 | 9/2009 |
| WO | 2012024641 A2 | 2/2012 |
| WO | WO-2015068043 A2 * | 5/2015 .......... H02J 7/00036 |

OTHER PUBLICATIONS

International Search Report and Written Opinion issued in International Application No. PCT/IN2015/050115, dated Apr. 4, 2016, 7 pages.

(Continued)

*Primary Examiner* — Jeffrey M Rutkowski
*Assistant Examiner* — Luna Weissberger
(74) *Attorney, Agent, or Firm* — Rothwell, Figg, Ernst & Manbeck, P.C.

(57) ABSTRACT

The present disclosure relates to methods for control of power source usage of a multi power source radio device 7. A method performed by a server 30 comprises obtaining information B 5 about a plurality of power sources available for the radio device. The method also comprises, based on the obtained information, determining criteria for when to use at least one of the plurality of power sources. The method also comprises sending a power source configuration message C towards the radio device, comprising information about the determined criteria, for enabling the radio device to use said at least one of the plurality of power sources in 10 accordance with the determined criteria.

18 Claims, 4 Drawing Sheets

(52) U.S. Cl.
CPC ... *H04W 52/0212* (2013.01); *H04W 52/0216* (2013.01); *H04W 52/0261* (2013.01); *Y02D 70/1262* (2018.01); *Y02D 70/21* (2018.01)

(58) Field of Classification Search
CPC ..... H04W 4/70; H04W 4/00; H04W 52/0261; G06F 1/263; G06F 1/266; G06F 1/26; Y02D 70/1262; Y02D 70/1264; Y02D 70/126; Y02D 70/12; Y02D 70/21; Y02D 70/20
USPC ........................................................ 370/331
See application file for complete search history.

(56) References Cited

OTHER PUBLICATIONS

"List of battery sizes", Wikipedia, Retrieved from "https://en.wikipedia.org/w/index.php?title=List_of_battery_sizes&oldid=827172534", last edited on Feb. 23, 2018. (18 pages).

\* cited by examiner

CONTROL OF POWER SOURCE USAGE OF A MULTI POWER SOURCE RADIO DEVICE

CROSS REFERENCE TO RELATED APPLICATION(S)

This application is a 35 U.S.C. § 371 National Stage of International Patent Application No. PCT/IN2015/050115, filed Sep. 22, 2015, designating the United States, the disclosure of which is incorporated by reference.

TECHNICAL FIELD

The present disclosure relates to control of power source usage in a radio device.

BACKGROUND

Mobile phones and other wireless devices may have multiple different power sources, e.g. a battery and a connection to the power grid or a main battery and a back-up battery. Phones are typically under its user's control, who can input commands to control the power usage of the phone, e.g. when to enter a power saving mode.

SUMMARY

It has been noted that it may be less convenient to have the power source usage of a multi power source radio device under the control of a user (owner), e.g. in case of Machine-to-Machine (M2M) devices, which are preferably automatically operated.

It is an objective of the present disclosure to provide improved control of power source usage in a multi power source radio device, e.g. when and how to use a power source of a plurality of power sources available to the radio device.

This is according to the present disclosure achieved by a network server, e.g. in the operator network or in a smart grid manager network or in a Packet Data Network (PDN) such as the Internet, sending instructions to the radio device to control how the radio device uses its multiple power sources.

According to an aspect of the present disclosure, there is provided a method for control of power source usage of a multi power source radio device. The method comprises obtaining information about a plurality of power sources available for the radio device. The method also comprises, based on the obtained information, determining criteria for when to use at least one of the plurality of power sources. The method also comprises sending a power source configuration message towards the radio device, comprising information about the determined criteria, for enabling the radio device to use said at least one of the plurality of power sources in accordance with the determined criteria.

According to another aspect of the present disclosure, there is provided a computer program product comprising computer-executable components for causing a server to perform an embodiment of a method of the present disclosure when the computer-executable components are run on processor circuitry comprised in the server.

According to another aspect of the present disclosure, there is provided a server for control of power source usage of a multi power source radio device. The server comprises processor circuitry, and storage storing instructions executable by said processor circuitry whereby said server is operative to obtain information about a plurality of power sources available for the radio device. The server is also operative to, based on the obtained information, determine criteria for when to use at least one of the plurality of power sources. The server is also operative to send a power source configuration message towards the radio device, comprising information about the determined criteria, for enabling the radio device to use said at least one of the plurality of power sources in accordance with the determined criteria.

According to another aspect of the present disclosure, there is provided a method performed in a multi power source radio device comprising interfaces for a plurality of power sources available for the radio device, for control of power source usage of said radio device. The method comprises receiving a power source configuration message comprising information about criteria for when to use at least one of the plurality of power sources, from a server. The method also comprises applying the criteria for use of said at least one of the plurality of power sources.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a multi power source radio device comprising a plurality of power source interfaces for a plurality of power sources available for the radio device, processor circuitry, and storage storing instructions executable by said processor circuitry whereby said radio device is operative to, from a server, receive a power source configuration message comprising information about criteria for when to use at least one of the plurality of power sources. The radio device is also operative to apply the criteria for use of said at least one of the plurality of power sources.

According to another aspect of the present disclosure, there is provided a computer program for control of power source usage of a multi power source radio device. The computer program comprises computer program code which is able to, when run on processor circuitry of a server, cause the server to obtain information about a plurality of power sources available for the radio device. The code is also able to cause the server to, based on the obtained information, determine criteria for when to use at least one of the plurality of power sources. The code is also able to cause the server to send a power source configuration message towards the radio device, comprising information about the determined criteria, for enabling the radio device to use said at least one of the plurality of power sources in accordance with the determined criteria.

According to another aspect of the present disclosure, there is provided a computer program for control of power source usage of a multi power source radio device comprising interfaces for a plurality of power sources. The computer program comprises computer program code which is able to, when run on processor circuitry of a the radio device, cause the radio device to receive a power source configuration message comprising information about criteria for when to use at least one of the plurality of power sources, from a server. The code is also able to cause the radio device to apply the criteria for use of said at least one of the plurality of power sources.

According to another aspect of the present disclosure, there is provided a computer program product comprising an embodiment of a computer program of the present disclosure and a computer readable means on which the computer program is stored.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
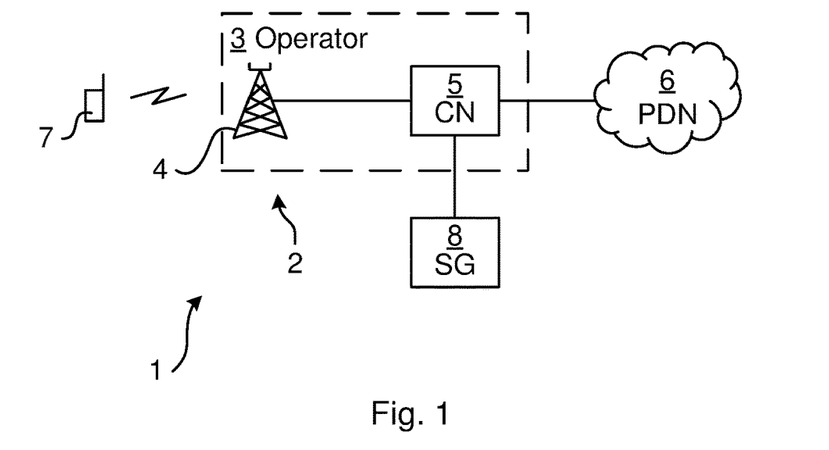
FIG. 1 is a schematic block diagram of an embodiment of a communication network in accordance with the present disclosure.

FIG. 1 illustrates an embodiment of a communication network 1 comprising a radio device 7 connected to an operator network 3, e.g. a telecom operator network. The operator network 3 comprises a Radio Access Network (RAN) 2 and a Core Network (CN) 5. The RAN 2 may be a cellular network e.g. in accordance with a Third Generation Partnership Project (3GPP) standard, or for example a Local Area Network (LAN), comprising at least one, typically a plurality, of RAN nodes 4, comprising at least one base station e.g. a Node B associated with a Radio Network Controller, or an enhanced Node B (eNB). The operator network 3 provides access for the radio device 7 to the PDN 6, e.g. the Internet.

In accordance with the present disclosure, a server for controlling the power source usage of the radio device is comprised in the communication network. The server may be comprised in the operator network 3, e.g. in the CN 5, but may alternatively be positioned outside of the operator network such as in the PDN 6 or in a network of a smart grid (SG) 8 manager.

The radio device 7 may be any device or user equipment (UE) configured for use of a plurality of power sources, i.e. a multi power source radio device, mobile or stationary, enabled to communicate over a radio channel in a communication network 1, for instance but not limited to e.g. mobile phone, smartphone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). Embodiments of the present disclosure may be especially beneficial for radio devices which are M2M devices. For instance, the radio device may be a M2M device, e.g. a sensor M2M device, comprised in a vehicle, such as in a car or truck.

Figure 2A:
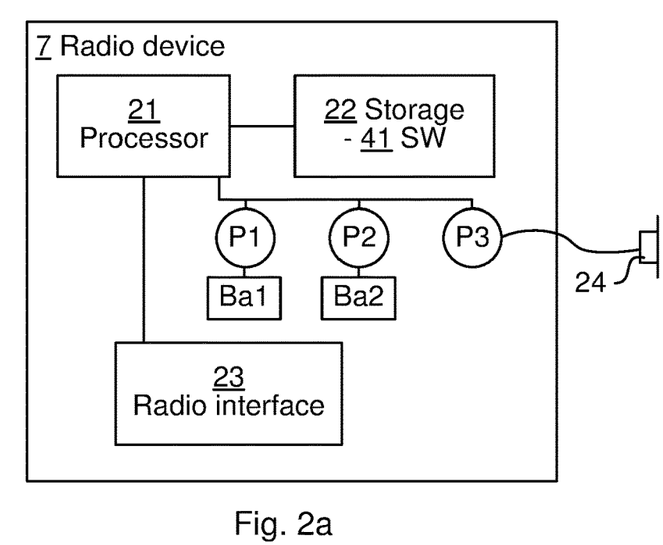
FIG. 2a is a schematic block diagram of an embodiment of a multi power source radio device of the present disclosure.

FIG. 2a illustrates an embodiment of a multi power source radio device 7. The radio device comprises a plurality of power source interfaces P. Power source interfaces P1 and P2 are for access to the battery power sources Ba1 and Ba2 (batteries) comprised in the radio device. The batteries Ba1 and Ba2 may be of the same size and type, e.g. identical, or may be different from each other, e.g. in size and or type. The batteries may e.g. have the same or different capacities, and may be of a type such as a regular smartphone type or e.g. a round button battery. Another power source interface P3 is an interface for connection to a power grid 24, which is an external power source available to the radio device 7. Other possible power sources, not shown in the figure, include e.g. photovoltaic power sources.

Further, the radio device 7 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 41 (see also FIG. 4) stored in a storage 22 of one or several storage unit(s) e.g. a memory. The storage unit is regarded as a computer readable means 43 (see FIG. 4) as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The radio device 7 also comprises a radio interface 23 for radio communication via the RAN 2. The radio interface 23 comprises a transmitter, a receiver and an antenna, which may be combined to form a transceiver or be present as distinct units within the radio device 7.

According to an aspect of the present disclosure, there is provided a multi power source radio device 7 comprising a plurality of power source interfaces P1, P2 and P3 for a plurality of power sources Ba1, Ba2 and 24 available for the radio device, processor circuitry 21, and storage 22 storing instructions 41 executable by said processor circuitry whereby said radio device is operative to receive a power source configuration message comprising information about criteria for when to use at least one of the plurality of power sources, from a server. The radio device is also operative to apply the criteria for use of said at least one of the plurality of power sources Ba1, Ba2 and 24.

Figure 2B:
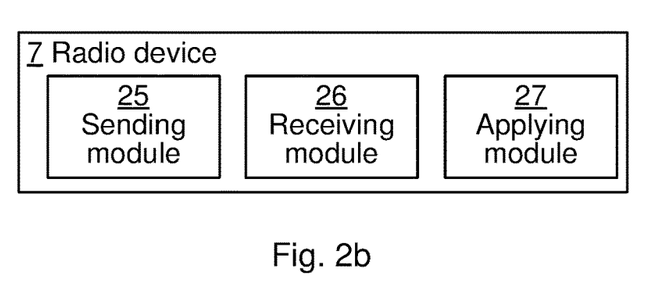
FIG. 2b is a schematic functional block diagram of an embodiment of a multi power source radio device of the present disclosure.

FIG. 2b is a schematic block diagram functionally illustrating an embodiment of the radio device 7 in FIG. 2a. As previously mentioned, the processor circuitry 21 may run a software 41 for enabling the radio device 7 to perform an embodiment of a method of the present disclosure, whereby functional modules may be formed in radio device 7 e.g. in the processor circuitry 21 for performing the different steps of the method. These modules are schematically illustrated as blocks within the radio device 7. Thus, the radio device comprises a receiving module 26 for receiving a power source configuration message comprising information about criteria for when to use at least one of the plurality of power sources, from a server. The radio device also comprises an applying module 27 for applying the criteria for use of said at least one of the plurality of power sources Ba1, Ba2 and 24. Optionally, the radio device also comprises a sending module 25 for sending power source information in a message to the server. In some embodiments, the receiving module 26 is also for receiving a power source request from the server requesting the information about the plurality of power sources Ba1, Ba2 and 24 available for the radio device 7. Alternatively, the modules 25-27 may be formed by hardware, or by a combination of software and hardware.

According to an aspect of the present disclosure, there is provided a multi power source radio device 7 comprising a plurality of power source interfaces P1, P2 and P3 for a plurality of power sources Ba1, Ba2 and 24 available for the radio device. The radio device comprises means 26 for receiving a power source configuration message comprising information about criteria for when to use at least one of the plurality of power sources, from a server. The radio device also means 27 for applying the criteria for use of said at least one of the plurality of power sources Ba1, Ba2 and 24. Optionally, the radio device also comprises means 26 for receiving a power source request from the server requesting the information about the plurality of power sources Ba1, Ba2 and 24 available for the radio device. Optionally, the radio device comprises means 25 for sending power source information in a message to the server.

Figure 3A:
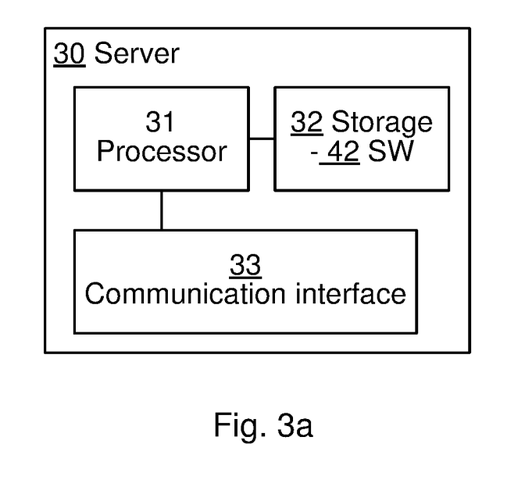
FIG. 3a is a schematic block diagram of an embodiment of a network server of the present disclosure.

FIG. 3a schematically illustrates an embodiment of a server 30 of the present disclosure. As mentioned above, the server 30 may reside in the operator network 3, e.g. in the CN 5, or outside the operator network 3 such as in an SG 8 network or on the Internet 6. The server 30 comprises processor circuitry 31 e.g. a central processing unit (CPU).

The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 42 (see also FIG. 4) stored in a storage 32 of one or several storage unit(s) e.g. a memory. The storage unit is regarded as a computer readable means 43 (see FIG. 4) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The server 30 also comprises a communication interface 33 for communication with other parts/nodes of the communication network 1, e.g. with the radio device 7 via the RAN 2. The communication interface 33 comprises a transmitter and a receiver which may be combined to form a transceiver or be present as distinct units within the server 30.

According to an aspect of the present disclosure, there is provided a server 30 for control of power source usage of a multi power source radio device 7. The server comprises processor circuitry 31, and storage 32 storing instructions 42 executable by said processor circuitry whereby said server is operative to obtain information about a plurality of power sources Ba1, Ba2 and 24 available for the radio device. The server is also operative to, based on the obtained information, determine criteria for when to use at least one of the plurality of power sources. The server is also operative to send a power source configuration message towards the radio device 7, the message comprising information about the determined criteria, for enabling the radio device to use said at least one of the plurality of power sources in accordance with the determined criteria.

Figure 3B:
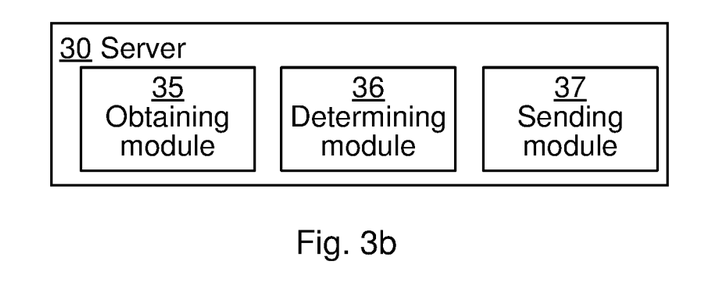
FIG. 3b is a schematic functional block diagram of an embodiment of a network server of the present disclosure.

FIG. 3b is a schematic block diagram functionally illustrating an embodiment of the server 30 in FIG. 3a. As previously mentioned, the processor circuitry 31 may run software 42 for enabling the server 30 to perform an embodiment of a method of the present disclosure, whereby functional modules may be formed in server 30 e.g. in the processor circuitry 31 for performing the different steps of the method. These modules are schematically illustrated as blocks within the server 30. Thus, the server 30 comprises an obtaining module 35 for obtaining information about a plurality of power sources Ba1, Ba2 and 24 available for the radio device 7. The server 30 also comprises a determining module 36 for, based on the obtained information, determining criteria for when to use at least one of the plurality of power sources. The server 30 also comprises a sending module for sending a power source configuration message towards the radio device 7, the message comprising information about the determined criteria, for enabling the radio device to use said at least one of the plurality of power sources in accordance with the determined criteria. In some embodiments, the sending module 37 may also be for sending a power source request to the radio device 7 requesting the information about the plurality of power sources Ba1, Ba2 and 24 available for the radio device. In some embodiments, the obtaining module may also be for receiving usage information from the radio device 7 about the usage of the plurality of power sources Ba1, Ba2 and 24 by the radio device. Alternatively, the modules 25-37 may be formed by hardware (e.g. parts or all of the obtaining and or sending modules 35 and 37 may be comprised in the communication interface 33), or by a combination of software and hardware.

According to an aspect of the present disclosure, there is provided a server 30 for control of power source usage of a multi power source radio device 7. The server comprises means 35 for obtaining information about a plurality of power sources Ba1, Ba2, 24 available for the radio device. The server also comprises means 36 for, based on the obtained information, determining criteria for when to use at least one of the plurality of power sources. The server also comprises means 37 for sending a power source configuration message towards the radio device 7, comprising information about the determined criteria, for enabling the radio device to use said at least one of the plurality of power sources in accordance with the determined criteria.

Figure 4:
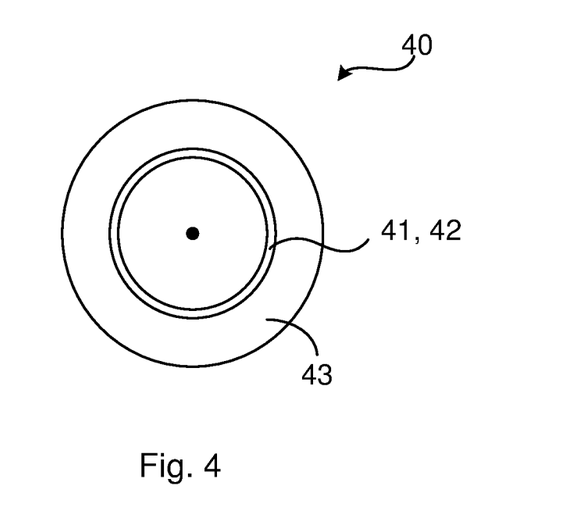
FIG. 4 is a schematic illustration of an embodiment of a computer program product of the present disclosure.

FIG. 4 illustrates a computer program product 40. The computer program product 40 comprises a computer readable (e.g. non-volatile and/or non-transitory) medium 43 comprising at least one computer program 41 and/or 42 in the form of computer-executable components 41/42. The computer program/computer-executable components may be configured to cause a device, e.g. the radio device 7 and/or server 30 the as discussed herein, to perform an embodiment of a method of the present disclosure. The computer program/computer-executable components may be run on the processor circuitry 21/31 of the device for causing it to perform the method. The computer program product 40 may e.g. be comprised in a storage unit or memory 22/32 comprised in the device and associated with the processor circuitry 21/31. Alternatively, the computer program product 40 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Figure 5:
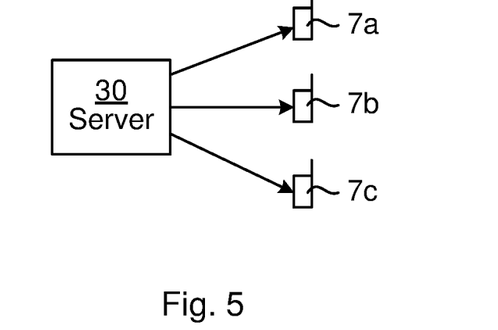
FIG. 5 is a schematic illustration of an embodiment of a server controlling a plurality of radio devices, in accordance with the present disclosure.

FIG. 5 illustrates how a server 30 may be associated with a plurality of radio devices 7, here radio devices 7a, 7b and 7c are shown as an example, but any number of radio devices may be associated with the same server e.g. hundreds of radio devices. In accordance with the present disclosure, the server can control how each radio device uses its available power sources, by sending the power source configuration message to said radio device, the message comprising instructions/criteria for in which situation a power source should or should not be used. The radio device 7 may, in accordance with the received power source configuration message, use one power source at the time for all its ongoing tasks, or it may use several power sources in parallel at the same time but for different tasks.

The criteria of the power source configuration message may be the same for all, or some of the, radio devices 7 associated with the server 30, or they may be individually chosen for each radio device depending on the properties/environment of that radio device. The criteria may be any type of criteria related to how a radio device may use its plurality of power sources, e.g. when in time to use a power source, and not another power source, and/or for which types of tasks to use a power source, and not another power source. Tasks are here regarded as (processing) operations of performed by the radio device, and may be associated with the running of a service provided by a service provider, e.g. by means of a service application (an app) installed in the radio device, or may be associated with internal or fundamental operations of the radio device e.g. for staying on-line or connected via the RAN 2 or performing pre-programmed tasks such as measurements and the like.

In some embodiments, the criteria for a power source comprises any from the group consisting of time of day/week/month/year for switching to the power source; duration of using the power source (e.g. to a predefined State of Charge (SoC) of the power source); if the power source is a battery Ba1 or Ba2, battery SoC for switching to or from the power source; task type(s) or priority(ies) for which the power source should, or should not, be used; service(s) or application(s) for which the power source should, or should not, be used; service provider(s) for which the power source should, or should not, be used; priority of the power source in relation to other power source(s) of the plurality of power sources; traffic type(s) for which the power source should, or should not, be used; and location(s) of the radio device for which the power source should, or should not, be used.

Here, "traffic type" relates to different types of traffic like video, data etc. or other traffic as classified by the operator or user involving the radio device e.g. a M2M device. Thus, the radio device 7 handling a particular traffic type (either in uplink or downlink) at a time can use different power sources in accordance with a criterion.

A criterion involving service provider type may involve to distinguish between different service providers associated with the service(s) running on the radio device. Using service provider name/ID, one or more radio devices may use the different power sources available to the radio device. A service provider may provide more than one service to one or several radio devices. A radio device may be associated with multiple services, provided by different service providers.

Here, "location" relates to the location of the radio device. This may be in order to have an additional criterion at operators end to control power source usage based on location of the radio device. Many M2M devices may be moving, stationary etc. depending on their respective uses. Therefore, location may by convenient at operator end as a power source usage criterion.

Figure 6:
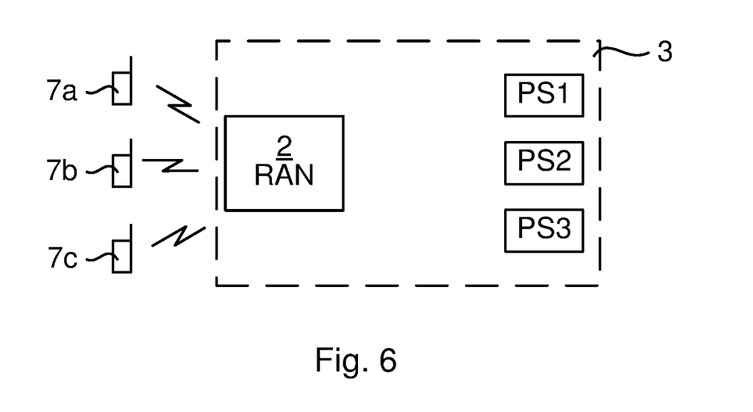
FIG. 6 is a schematic illustration of an embodiment of an operator network in accordance with the present disclosure.

FIG. 6 illustrates how the operator network 3, or any other network comprising the server 30, may on a functional level, by means of software, comprise a plurality of power source slices PS. Here three power source slices PS1, PS2 and PS3 are shown as an example. Each PS may be associated with a type of power source (e.g. battery Ba, power grid 24 etc.) available for the plurality of radio devices 7a-c associated with the server 30. A PS may e.g. hold a list of radio devices 7 currently using, or able to use, the power source or power source type which said PS is associated with.

Figure 7:
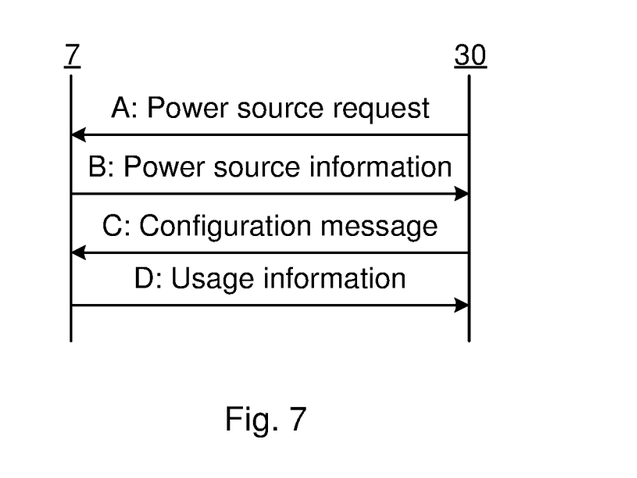
FIG. 7 is a schematic signalling diagram in accordance with embodiments of the present disclosure.

FIG. 7 is a schematic signalling diagram illustrating interactions between the server 30 and a radio device 7, of embodiments of the present disclosure.

A power source request A may be sent from the server 30 and received by the radio device 7. The power source request A may e.g. request information about power sources available to the radio device, e.g. which power sources or types of power sources are available, what is the status of each of the available power sources (SoC etc.), what are the properties of each of the available power sources (size, capacity, voltage, current etc.). Additionally, the power source request may request other information about the radio device, e.g. which services/applications/tasks it is/will be/may be running.

In response, the radio device 7 may send power source information B which is received by the server 30. The power source information B may comprise information about the available power sources in response to the information requested in the power source request A, and may additionally comprise other information which may be relevant to the server 30 for properly controlling the power source usage of the radio device.

Based on the obtained power source information B from each of the associated radio devices 7, the server 30 forms a power source configuration message C, for each of the radio devices, which comprises criteria for control of the power sources usage of the radio device. For instance, in the power source configuration message C, the respective available power source Ba1, Ba2 and 24 may be associated with applications, services and/or tasks of the radio device, indicating to the radio device to use the power source associated with the application, service or task when running/performing it. A service/application/task may for example not be run/performed unless its associated power source is available or has enough power. For instance, certain power consuming tasks may only be performed using a power grid as a power source. The power source configuration message C may be sent once, e.g. when configuring the radio device 7, after which it is up to the radio device to use the criteria therein to choose how to use its power sources, independently of the server 30, e.g. until the radio device is reconfigured, restarted or the like. Alternatively, the server 30 may regularly/periodically or continuously transmit source configuration messages C to control the radio device power source usage in real time.

The radio device 7 may send back usage information D, which is received by the server 30. The server may then follow up on the functionality of the criteria sent in the configuration message B, and may for instance adjust the criteria in view thereof in the next configuration message B to that radio device 7.

Figure 8A:
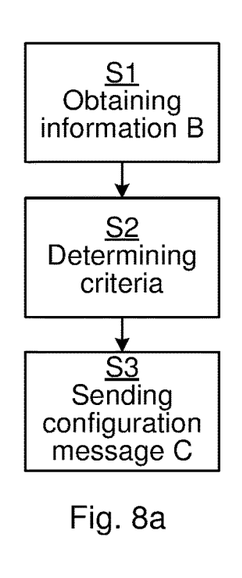
FIG. 8a is a schematic flow chart of an embodiment of a method performed by a server, in accordance with the present disclosure.

FIG. 8a is a schematic flow chart of an embodiment of a method performed by the server 30, in accordance with the present disclosure.

Information B about a plurality of power sources Ba1, Ba2 and 24 available for use by the radio device 7 is obtained S1. The obtaining S1 may e.g. comprise receiving the power source information B in a message from the radio device 7.

Based on the obtained S1 information, the server 30 determines S2 criteria for when the radio device 7 should use at least one of the plurality of power sources.

Then, the server 30 sends S3 a power source configuration message C towards the radio device 7. The power source configuration message C comprises information about the determined S2 criteria, for enabling the radio device to use said at least one of the plurality of power sources in accordance with the determined criteria.

Figure 8B:
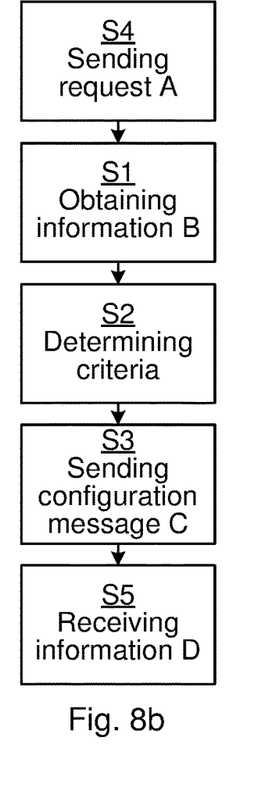
FIG. 8b is a schematic flow chart of another embodiment of a method performed by a server, in accordance with the present disclosure.

FIG. 8b is a schematic flow chart of another embodiment of a method performed by the server 30. The steps of obtaining S1 information B, determining S2 criteria, and sending S3 a power source configuration message C, are as discussed in relation to FIG. 8a.

In addition, the server 30 may in some embodiments, prior to obtaining S1 the information B, send S4 a power source request A to the radio device 7 requesting the information B about the plurality of power sources Ba1, Ba2 and 24 available for the radio device.

Additionally or alternatively, the server 30 may in some embodiments receive S5 usage information D from the radio device 7 about the usage of the plurality of power sources Ba1, Ba2 and 24 from the radio device.

Figure 9A:
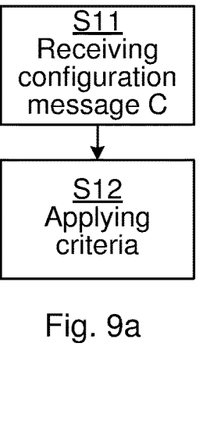
FIG. 9a is a schematic flow chart of an embodiment of a method performed by a radio device, in accordance with the present disclosure.

FIG. 9a is a schematic flow chart of an embodiment of a method performed by a radio device 7, in accordance with the present disclosure.

The radio device 7 receives S11 a power source configuration message C comprising information about the criteria for when to use at least one of the plurality of power sources. The power source configuration message C is from the server 30, as discussed above.

Then, the radio device applies S12 the criteria for use of said at least one of the plurality of power sources Ba1, Ba2 and 24.

Figure 9B:
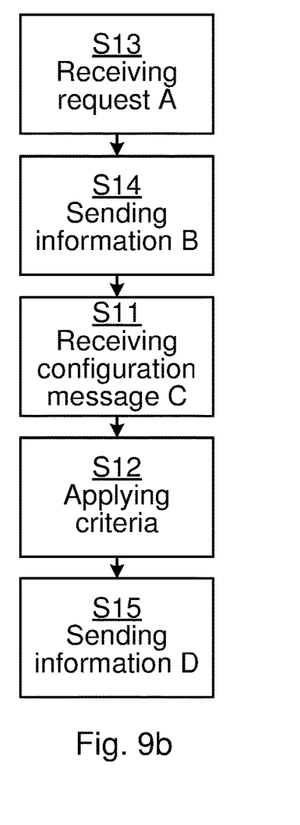
FIG. 9b is a schematic flow chart of another embodiment of a method performed by a radio device, in accordance with the present disclosure.

FIG. 9b is a schematic flow chart of another embodiment of a method performed by the radio device. The steps of receiving S11 a power source configuration message C, and of applying S12 the criteria, are as discussed in relation to FIG. 9a.

In some embodiments, the radio device 7, prior to the receiving S11 of the power source configuration message C, also receives S13 a power source request A from the server 30 requesting the information B about the plurality of power sources Ba1, Ba2 and 24 available for the radio device.

Additionally or alternatively, in some embodiments, the radio device also sends S14 power source information B in a message to the server 30, e.g. in response to receiving S13 a power source request A.

Additionally or alternatively, in some embodiments, the radio device, before and/or after the applying S12 of the criteria, also sends S15 usage information D to the server 30 about the usage of the plurality of power sources Ba1, Ba2 and 24 by the radio device.

Example—Vehicle Comprising M2M Devices

A smart connected vehicle (fuel based vehicle or electric vehicle) may comprise for example 200-300 heterogenous sensor devices for different uses and purposes such as for measuring temperature, location and the like. An automotive industry may deploying multi power source M2M device(s) 7 inside the vehicle with a direct or indirect communication interface (i.e. direct connected device or device behind gateways) toward network operators 3, for supporting different uses.

An operator 3 may choose to provision a configuration controlling the power source usages in one of the multi power source M2M devices 7, so as to manage handling of tasks/operations (triggered by e.g. application/network/device domain) on one or more power sources Ba1, Ba2, 24 or other available at the multi-power source M2M device in accordance with operator's priority and criteria at a time and location of the vehicle.

For example, updating the firmware versions over LTE network in different multi-power source M2M sensor device(s) 7 in a connected vehicle, parked at a designated parking location during night time. Based on the provisioned configuration in a radio device 7, a task (or set of sub-tasks)

may be associated with different power sources available in the radio device, in accordance with operator's criteria for time, location, devices, tasks, moving or stationary connected vehicle etc.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for controlling power source usage of a multi-power source (MPS) radio device, the method comprising:
   a server obtaining first power source information about a first power source available to the radio device and second power source information about a second power source available to the radio device, wherein the first power source is a first type of power source, the second power source is a second type of power source, and the first type and the second type are different;
   using the obtained first and second power source information, the server determining a rule for use by the radio device in selecting, from a plurality of available power sources including the first power source of the first type and the second power source of the second type, at least one power source from which to draw power, wherein the plurality of available power sources comprises the first power source and the second power source; and
   the server sending toward the radio device a power source configuration message comprising information identifying the determined rule for use by the radio device in selecting, from the plurality of available power sources including the first power source of the first type and the second power source of the second type, said at least one power source from which to draw power, thereby enabling the radio device to use the rule to select said at least one power source from the plurality of power sources in accordance with the determined rule.

2. The method of claim 1, wherein the rule comprises any one or more of:
   time for switching to a power source;
   duration of using a power source;
   battery state of charge for switching to or from a power source;
   a task type and/or a priority for which a power source should, or should not, be used;
   a service or an application for which a power source should, or should not, be used;
   a service provider for which a power source should, or should not, be used;
   priority of a power source in relation to at least one other power source of the plurality of power sources;
   a traffic type for which a power source should, or should not, be used; and
   a location of the radio device for which a power source should, or should not, be used.

3. The method of claim 1, wherein the server comprises a plurality of power source slices (PS) each of which holds a list of one or more radio devices that are currently using or are capable of using a particular type of power source.

4. The method of claim 1, wherein the obtaining comprises receiving a message including the first power source information and the second power source information, wherein the message was sent from the radio device.

5. The method of claim 1, further comprising:
   sending toward the radio device a power source request requesting power source information about the plurality of power sources available for the radio device.

6. The method of claim 1, further comprising:
   receiving usage information sent from the radio device about the usage of the plurality of power sources.

7. A computer program product comprising a non-transitory computer readable medium storing computer-executable components for causing the server to perform the method of claim 1 when the computer-executable components are run on processor circuitry included in the server.

8. A server for controlling power source usage of a multi-power source (MPS) radio device, the server comprising:
   processor circuitry; and
   storage storing instructions executable by said processor circuitry, wherein said server is operative to:
   obtain first power source information about a first power source available to the radio device and second power source information about a second power source available to the radio device, wherein the first power source is a first type of power source, the second power source is a second type of power source, and the first type and the second type are different;
   by using the obtained first and second power source information, determine a rule for use by the radio device in selecting, from a plurality of available power sources including the first power source of the first type and the second power source of the second type, at least one power source from which to draw power, wherein the plurality of available power sources comprises the first power source and the second power source; and
   send toward the radio device a power source configuration message comprising information identifying the determined rule for use by the radio device in selecting, from the plurality of available power sources including the first power source of the first type and the second power source of the second type, said at least one power source from which to draw power, thereby enabling the radio device to use the rule to select said at least one power source from the plurality of power sources in accordance with the determined rule.

9. A method performed in a multi-power source (MPS) radio device comprising a first interface for a first power source available to the radio device and a second interface for a second power source available to the radio device, the method comprising:
   receiving a power source configuration message comprising information identifying a rule for use in selecting, from a plurality of available power sources including the first power source and the second power source, at least one power source from which to obtain power wherein the first power source is a first type of power source, the second power source is a second type of power source, and the first type and the second type are different;
   using the rule, selecting at least one of the plurality of available power sources including the first power source of the first type and the second power source of the second type in accordance with the rule; and
   after selecting the at least one power source, obtaining power from the selected at least one power source.

10. The method of claim 9, wherein the rule comprises any one or more of:
    time for switching to a power source;
    duration of using a power source;

battery state of charge for switching to or from a power source;

a task type and/or a priority for which a power source should, or should not, be used;

a service or an application for which a power source should, or should not, be used;

a service provider for which a power source should, or should not, be used;

priority of a power source in relation to at least one other power source of the plurality of power sources;

a traffic type for which a power source should, or should not, be used; and a location of the radio device for which a power source should, or should not, be used.

11. The method of claim 9, wherein the radio device is a Machine-to-Machine (M2M) device.

12. The method of claim 9, further comprising:
receiving a power source request sent from the server requesting power source information about the plurality of power sources available for the radio device.

13. The method of claim 9, further comprising:
sending a message including power source information toward the server.

14. The method of claim 9, further comprising:
sending usage information toward the server about the usage of the plurality of power sources by the radio device.

15. A computer program product comprising a non-transitory computer readable medium storing computer-executable components for causing a radio device to perform the method of claim 9 when the computer-executable components are run on processor circuitry included in the radio device.

16. A multi-power source (MPS) radio device comprising:
a first interface for a first power source available to the radio device and a second interface for a second power source available to the radio device;

processor circuitry; and storage storing instructions executable by said processor circuitry, wherein said radio device is operative to:

receive a power source configuration message comprising information identifying a rule for use in selecting, from a plurality of available power sources including the first power source and the second power source, at least one power source from which to obtain power, wherein the first power source is a first type of power source, the second power source is a second type of power source, and the first type and the second type are different;

by using the rule, select at least one of the plurality of available power sources including the first power source of the first type and the second power source of the second type in accordance with the rule; and after selecting the at least one power source, obtain power from the selected at least one power source.

17. The multi-power source radio device of claim 16, wherein the radio device is a Machine-to-Machine (M2M) device.

18. The multi-power source radio device of claim 16, wherein the radio device is included in a vehicle.

* * * * *